Figure 1:
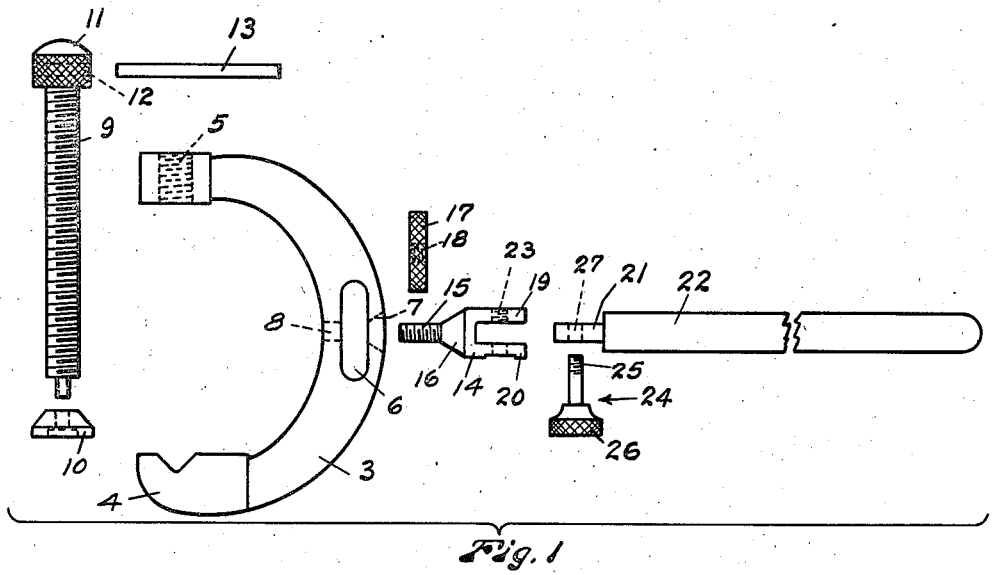

Oct. 26, 1948.　　　　M. E. HESTER　　　　2,452,301

DIAL TEST INDICATOR CLAMP

Filed Aug. 8, 1945

INVENTOR.
Millard E. Hester
BY
Arnold and Mathis
ATTORNEYS

Patented Oct. 26, 1948

2,452,301

UNITED STATES PATENT OFFICE 2,452,301

DIAL TEST INDICATOR CLAMP

Millard E. Hester, Seattle, Wash.

Application August 8, 1945, Serial No. 609,673

4 Claims. (Cl. 248—226)

My invention relates to a device for mounting a micrometer with a dial indicator of the type generally known as dial test indicators. More particularly my invention relates to a clamp for holding such a micrometer in any desired angular position.

In operating machine tools, such as an engine lathe, a micrometer indicator with a dial is used to indicate relative positions of the work. For example, the dial indicator may be adjusted adjacent a cylindrical piece of work and then as the work is rotated movement of the needle of the dial indicator will indicate information desired, such as the amount that the work is out of true round, depressions in the work, alignment of the work, or other desired information.

Heretofore dial indicators were connected to a shaft and then the shaft was rigidly connected to a clamp and without means providing relative movement between the shaft and the clamp. Thus many desired positions of the instrument relative to the work were difficult if not impossible to obtain.

Also, heretofore it was common practice in mounting a dial indicator to employ a C clamp and to rigidly connect an open end portion of the C clamp to a shaft or beam. It is an object of my invention not only to connect the beam or shaft to the C clamp by universal joint means but to connect the central portion of the C clamp in such way to a beam. Another object of my invention is to provide readily engageable thumb screw means to permit adjustment and then fixation of particular means providing universal movement between a C clamp and a beam which beam in turn mounts a dial indicator.

Figure 2:
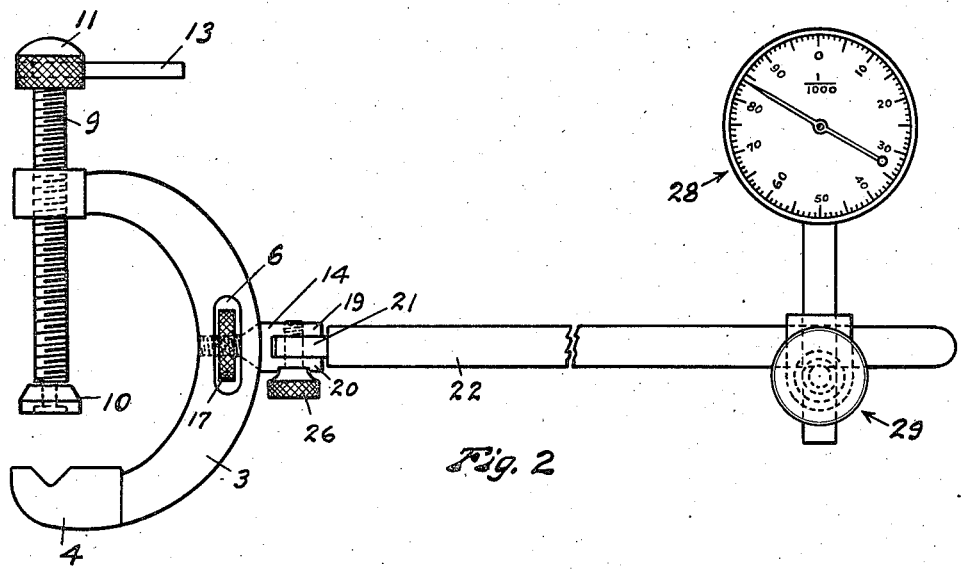

The above mentioned general objects of my invention, together with others inherent in the same, are attained by the mechanism illustrated in the following drawings, the same being a preferred exemplary form of embodiment of my invention, throughout which drawings like reference numerals indicate like parts:

Figure 1 is an exploded view in side elevation showing the various parts of my invention in detached relation; and Figure 2 is an assembled view in side elevation showing my invention with a dial indicator attached to the beam.

Referring to the drawings, a C clamp comprises a U-shaped or C member 3. The member 3 is provided with a jaw-like portion 4 at one end of the C; a threaded bore 5 at the other end of the C like portion; a transverse slot 6; a tapered bore 7; and a bore 8. A threaded shaft 9 threadedly fits in bore 5 and rotatively carries at one end a jaw 10. The jaw 10 cooperates with the jaw 4 to provide clamping means. A boss 11 is secured to the other end of the threaded shaft 9 and is provided with a bore 12 which receives a bar pin 13. Thus upon turning of the bar pin 13 the threaded shaft 9 may be rotated and the jaw 10 can be moved toward and away from the jaw 4 to tighten or loosen the clamp from a desired support. A swivel post 14 integrally carries at one end a threaded shaft 15 and a tapered portion 16. The threaded shaft 15 and tapered portion 16 may be inserted through the openings 7, 6 and 8. After inserting the portion 15 into the opening 7, then the swivel post lock nut 17 is inserted laterally into the opening 6 and the threaded bore 18 of the lock nut 17 is threadedly secured on the threaded shaft 15. Upon tightening of the lock nut 17 the desired amount, then the tapered portion 16 of the swivel post 14 will be wedged into the tapered bore 7 and relative rotary movement between the swivel post 14 and C clamp 3 is prevented. Thus, after the desired relative rotary adjustment between the swivel post 14 and the C clamp 3 is obtained, the lock nut or thumb nut 17 can be tightened and the adjustment obtained can be retained.

The swivel post 14 is provided with two leg members 19 and 20 which receive therebetween a flattened portion 21 of the beam 22. The leg members 19 and 20 are provided with an aligned bore and one portion of the bore, as 23, is internally threaded. A fastener 24 is provided at one end with a threaded portion 25 and at the other end with a thumb nut 26. Thus the flattened portion 21 of the beam 22 can be inserted lengthwise in the space between the leg members 19 and 20 and then the fastener 24 can be inserted in the bore of the member 20 through the bore 27 in the flattened portion 21 and then tightened into the threaded portion 23 of the leg member 19. Before tightening of the fastener 24 the desired angular movement of the beam 22 and the swivel post 14 is provided, and then by tightening of the fastener 24 such adjusted angular position is retained.

At this stage of the description of my invention it is important to note that I have provided for relative rotary movement between a beam 22 and a C clamp 3, relative angular movement between said parts and thumb nut means which are operable to permit such relative movements and to lock any adjusted position which has obtained. It is further important to note that I have provided interconnection between the beam 22 and the substantially central portion of the C clamp 3.

Referring to Fig. 2 of the drawings, the C clamp 3 is secured to any desired support (not shown) so as to be fixed and in the desired proximity to the work. Then by loosening of thumb nut 17 and thumb nut 26, universal movement between the C clamp 3 and the beam 22 obtains and after the desired angular movement, the thumb nuts 17 and 26 may be tightened and the relative positions between the beam 22 and the C clamp 3 may be maintained. Of course thumb nuts 17 and 26 may be jointly or severally loosened and tightened as desired.

At the end portion of the beam 22 remote from the C clamp 3, I have shown a clamp 29 and dial indicator 28. The clamp 29 is of the type providing universal movement between the beam 22 and the dial indicator 28. The universal movement provided by clamp 29 is not sufficient to provide for positioning the dial indicator 28 properly relative to work commonly encountered. In the use of the prior art clamps employing a C clamp and a beam rigid therewith, the beam was secured to an end portion of the C clamp, such as in close proximity with the jaw 4 and it was necessary to move the connection of the C clamp relative to a machine, as an engine lathe, to find some portion of the machine which would project the beam 22 at the desired angle. Often the machine did not have a part which was strategically located in position and angulation and makeshift means were provided for mounting the C clamp at a desired angle in order to locate the dial indicator in the desired angular relation to the work. In my invention I am able to connect the C clamp to any portion of a machine tool which has merely the desired proximity to the work and thereafter by the relative universal movement between the beam 22 and the C clamp 3 to project the shaft 22 at an angle so that the clamp 29 will secure the dial indicator 28 exactly in the desired alignment so that the dial indicator will indicate the measurements involved.

Dial indicators, as commonly used, measure in thousandths of an inch, and in various machine tool work it may be desired to indicate the relative position of any surface of the work. Such surface may be, for example, the external surface of a cylinder, the end portions of a cylinder, angular or tapered portions, and many others. In the operation of machine tools, the finished work may have faces projecting in many planes and as such surfaces are to be measured within machine tool limits, it is necessary that a dial indicator may be mounted with such precision and such accuracy that variations in thousandths of an inch may be readily and accurately indicated.

Obviously, changes may be made in the forms, dimensions, and arrangement of the parts of my invention, without departing from the principle thereof, the above setting forth only a preferred form of embodiment.

I claim:

1. A dial test indicator clamp comprising a C clamp; a post rotatively connected with the frame member of the C clamp and intermediate the ends thereof; adjustable locking means securing said post to said C clamp; a dial indicator supporting beam hinged to said post; and adjustable locking means securing said beam to said post.

2. A dial test indicator clamp comprising a C clamp provided with a bore disposed in the frame thereof and intermediate the ends thereof; a post rotatively mounted in said bore; adjustable locking means securing said post to said C clamp by urging the said post into said bore and against the said clamp; a dial indicator supporting beam hinged to said post; and adjustable locking means securing said beam to said post.

3. A dial test indicator clamp comprising a C clamp; a post rotatively connected with the frame member of the C clamp and intermediate the ends thereof; adjustable locking means securing said post to said C clamp; and a dial indicator supporting beam connected by hinge means to said post, said hinge means comprising a U-shaped portion, a transverse bore, and internal thread means in one portion of the bore carried by said post, a flattened portion on the beam with a bore therein, and a locking threaded screw insertable through the bores in the post and the beam and threadedly engageable with the threaded bore in the post.

4. A dial indicator clamp comprising a C clamp provided with a bore disposed substantially centrally of the ends of the frame thereof, said bore having a tapered portion, a transverse slot, and a straight bore; adjustable locking means comprising a locking nut insertable in said transverse slot; a post rotatable in said bore and threadedly connected with said locking nut; and a dial indicator supporting beam connected by hinge means to said post, said hinge means comprising a U-shaped portion, a transverse bore, an internal thread means in one portion of the bore carried by said post, a flattened portion on the beam with a bore therein, and a locking threaded screw insertable through the bores in the post and the beam and threadedly engageable with the threaded bore in the post.

MILLARD E. HESTER.

REFERENCES CITED

The following references are of record in the file of this patent:

UNITED STATES PATENTS

| Number | Name | Date |
|---|---|---|
| 967,877 | Bauer | Aug. 23, 1910 |
| 2,258,175 | Coleman | Oct. 7, 1941 |
| 2,379,379 | Schroder | June 26, 1945 |